United States Patent Office 3,034,896
Patented May 15, 1962

3,034,896
PRODUCTION OF CRACKERS
Thomas W. Humphreys, Plainfield, and Dudley S. Titus, Westfield, N.J., assignors to Merck & Co., Inc., Rahway, N.J., a corporation of New Jersey
No Drawing. Filed Feb. 15, 1960, Ser. No. 8,502
18 Claims. (Cl. 99—86)

This invention relates to an improved method of producing crackers. More particularly, it is concerned with an improvement in the preparation of fermented cracker sponge.

In the manufacture of crackers, a fermented cracker sponge is incorporated with flour, soda and other ingredients to form a dough. This dough is then allowed to ferment for about 4 to 6 hours and the fermented dough is baked to produce the finished crackers.

The fermented cracker sponge is made by fermenting a cracker sponge made up of flour and water thereby forming lactic acid in the sponge. The microorganisms for the lactic acid fermentation are usually supplied by the contaminants present in the sponge ingredients, or by including in the sponge a portion of a previously fermented sponge. In addition, yeast is usually added to the sponge and the yeast fermentation takes place concurrently with the lactic acid fermentation. The time required for this fermentation is about 18 to 21 hours at a temperature of about 22–30° C.

This method of carrying out the sponge fermentation is not entirely satisfactory, since the time required for the fermentation to produce the optimum amount of lactic acid varies from batch to batch, depending in part upon the quantity of lactic acid producing ferments present in the particular batch. On a commercial scale, it is generally not possible to vary the fermentation time and hence there is some variation in the lactic acid content of the cracker dough.

It is an object of the present invention to provide an improved means of carrying out the sponge fermentations under reproducible conditions, whereby the optimum amount of lactic acid can be readily controlled. Another object is to provide a method whereby the time of fermentation for the preparation of the cracker sponge can be shortened. Other objects will be apparent from the detailed description of this invention hereinafter provided.

In accordance with the present invention, it is now found that these objects are achieved by carrying out the sponge fermentation in the presence of *Pediococcus cerevisiae* in combination with a suitable source of assimilable carbohydrate. Thus, by including *Pediococcus cerevisiae* in the cracker sponge together with a suitable source of assimilable carbohydrate, it is possible to control more precisely the fermentation time and, in addition, to utilize a shorter fermentation time.

The suitability of *Pediococcus cerevisiae* as a ferment for cracker sponge is surprising as it is not generally suitable as a ferment in food processing. Thus, whereas this organism is used in the meat industry for production of fermented sausage, it is not suitable as such and without modification for use as a dairy starter culture or for the removal of glucose from egg white in the production of dehydrated egg white.

The advantages realized by using *Pediococcus cerevisiae* according to the invention are that shorter time periods are required for the fermentation, and the fermentation is more closely reproducible. Thus, whereas heretofore the fermentation period is commonly about 18 hours, according to the invention, this period can be about 15 hours or less, for example, about 12 hours or even less. With respect to reproducibility of the fermentation improvement is realized since utilization of *Pediococcus cerevisiae* obviates reliance upon natural contaminants as the ferment. The natural contaminants occur in varying amounts and hence tend to provide inconsistent results. While the natural contaminants are present when *Pediococcus cerevisiae* is used, under such conditions, variation in the amount of natural contaminants is not significant and does not significantly alter the fermentations.

Crackers have been made under commercial conditions and employing *Pediococcus cerevisiae* according to the invention. These crackers are of good quality and are generally satisfactory. A slight difference in flavor could be detected by taste experts, but the flavor of the *Pediococcus cerevisiae* derived crackers was not undesirable and the difference was considered insignificant.

The fermentation of cracker sponge involves essentially the production of lactic acid and the *Pediococcus cerevisiae* is effective to promote production of this acid in the sponge. The amount of *Pediococcus cerevisiae* added depends on the rate of fermentation desired. The addition of any of the cells would increase the rate of fermentation. It is estimated the addition of about 0.36 gram per 100 pounds of flour would be necessary in order to achieve an appreciable increase in fermentation rate. If the cells are used in combination with another bacterial culture, the amount should be sufficient so that the level for the combination is equivalent in activity to the *Pediococcus cerevisiae* at a level of 0.36 gram/100 pounds of flour. In general, the amount of *Pediococcus cerevisiae* can be a small but effective amount for the fermentation, e.g. about 0.36 gram per 100 pounds of flour, up to about 10–20 grams per 100 pounds of flour. The upper limit is not critical and more can be used but normally no advantage will be gained by using more than about 10 grams per 100 pounds of flour. Commonly, the amount employed is in the range of about 0.36–6 grams per 100 pounds of flour.

The *Pediococcus cerevisiae* cells can be added to the sponge as a dry preparation, or it can be rehydrated in warm water (30°–37° C.) for a period of about 1–24 hours and then added to the sponge as a liquid suspension. It is desirable to rehydrate the ferment before addition to the sponge as otherwise the rehydration occurs in the sponge and fermenting action of the cells is delayed pending the rehydration. This delay can be about 2–8 hours.

As is described in detail hereinafter, it is also desirable to include a suitable source of organic nitrogen such as yeast products, proteins, amino acids, and the like in the sponge as nutrient for the cells. Advantageously, this nutrient can be added to the rehydration medium.

The assimilable carbohydrate which must be present in the sponge for the fermentation can be glucose, sucrose, fructose and the like. Glucose is preferable to sucrose as it is fermented at a more rapid rate by *Pediococcus cerevisiae* cells. The carbohydrate can be added to the sponge separately or it can be added with the *Pediococcus cerevisiae* cells. A composition of the cells and carbohydrate which we have found to be well suited is an active dry preparation of *Pediococcus cerevisiae* cells admixed with glucose in proportion of 0.5 gram of dry cells in about 28 grams of the admixture. If desired, instead of adding a carbohydrate to the sponge, diastatic malt can be added to the sponge. The malt will break down some of the flour starch to glucose and thereby provide the required carbohydrate.

Accordingly, the term "assimilable carbohydrate," as used herein, includes, wherever the context so admits or requires, such carbohydrates whether added to the sponge or formed in situ as a result of the addition of an agent capable of diastatic action.

Baker's yeast is normally included in cracker sponge to effect a yeast fermentation and impart the proper flavor and quality to the crackers. In the practice of the invention, baker's yeast can be included in the sponge in the amounts in which it is normally used. Production of lactic acid by *Pediococcus cerevisiae*, however, is reduced when baker's yeast is present in the sponge, and it appears the baker's yeast ferment and the *Pediococcus cerevisiae* compete for the nutrients. Improved results, in terms of increased production of lactic acid are obtained when the amount of baker's yeast is reduced. Thus, the amount of baker's yeast can advantageously be about 20% of that normally used in cracker sponge, e.g. about 0.02%–0.06 wt. percent of the sponge instead of about 0.2 wt. percent which is a commonly used level. If desired, the baker's yeast can be added to the dough to which the fermented sponge is added, instead of adding it to the sponge.

As indicated above, yeast products can be employed to advantage as nutrients for the *Pediococcus cerevisiae*. Suitable yeast products for this purpose are yeast extract, inactive yeast, solubilized yeast and yeast autolysate. A preferred nutrient is yeast extract. This nutrient provides a synergistic effect as acid production where yeast extract is present can be about twice as great as the sum of acid production in sponge in which yeast extract and *Pediococcus cerevisiae* are each present alone. Where the cells and yeast extract are used together, the the proportion of these materials can be about 0.36–6 grams of cells per 100 pounds of flour and 0.5–3.0 wt. percent yeast extract of the sponge. In general, utilization of yeast extract together with the cells permits attaining pH values for the sponge of about 4.0–4.5 in 18 hours or less.

Investigation has revealed that ingredients of the yeast products which provide stimulation of acid production by *Pediococcus cerevisiae* are amino acids such as protein hydrolysate amino acids and the combination of the purines adenine and guanine, and the combination tryptophane and cysteine. Thus, in place of the yeast extract or other yeast product, there can be employed any source of readily available amino acids, such as protein hydrolysates, e.g. casein hydrolysates, and yeast autolysate, etc., and mixtures such as amino acids and adenine or amino acids, tryptophane and guanine. Vitamins, the pyrimidines and the purine adenine alone, were found to be ineffective for the purposes of the invention. The ineffective yeast extract ingredients can of course be present in the ferment employed, and thus amino acid preparations containing vitamins can be employed.

Suitable criteria for indicating the operation of ferments in cracker sponges are changes in pH during fermentation and increase in acidity during fermentation. The values for these figures reported herein, unless otherwise indicated, were obtained in the course of laboratory experiments wherein 50–60 gram portion of sponge, formed of thoroughly mixed water, baker's yeast, ferment, and flour in the proportion of 1000 parts of flour, 416 parts of water and 2 parts baker's yeast, was pressed to the bottom of a beaker to exclude air, and then sealed from air by a layer of vaspar (½ paraffin, ½ petroleum jelly). The samples were then placed in an incubator at 37° C., and after appropriate inoculation periods were removed for analysis. The pH and acidity determinations were made by blending sponges with 400 mls. of distilled water in a Waring Blendor, and then measuring pH with a Beckman model H–2 pH meter and acidity by titration to pH 8.2 with sodium hydroxide. The acidity was calculated as percent lactic acid, and the difference between the initial and final percent acidity was taken as the increase in acidity during fermentation.

The values for acidity and pH determined as described above differ from the corresponding values for commercial sponges wherein the ferments employed and fermenting conditions are the same. Thus, the pH of commercial fermented sponge is normally within the range of pH 4.3–5.0, while the corresponding pH for laboratory sponges is 4.5–5.0. Apparently the difference is unavoidable incident to laboratory scale operation as opposed to commercial scale operation. The laboratory values are however indicative of the effectiveness of the treatment of the invention as the ferments employed effect the commercial sponges and laboratory sponges in the same way.

Where *Pediococcus cerevisiae* cells are employed as ferment, pH values for the fermented sponge can be about 4.1–4.8, and comparable values for the usual known cracker sponge fermentations are about 4.3–5.0. Further, the change in acidity for the cases in which *Pediococcus cerevisiae* is employed is significantly greater than it is for the usual known fermentations. In considering the comparable results referred to here, it should be noted that reference is made to fermentations in which the fermentation period is the same. The pH values and acidity obtained according to the invention might be obtained by known fermentation procedures but, for the known procedures, longer fermentation periods would be required. Moreover, the known procedures would not be reproducible, in terms of the fermentation period, as are fermentation of the invention.

The following examples indicate the effectiveness of fermentation according to the invention in terms of change in pH and increase in acidity. In the examples, percentages are weight percent of the wet cracker sponges unless otherwise indicated, and, unless otherwise indicated, the sponges were formulated and tested as described hereinbefore for the laboratory testing of ferments. Further, in the examples, the notation "P.c.-dextrose" is for a dry *Pediococcus cerevisiae*-dextrose admixture containing 0.5 gram of the cells in 28.35 grams of the admixture.

EXAMPLE I

In the following table there are set forth results of fermentations wherein there was employed P.c.-dextrose fortified with yeast extract (Y.E.) as indicated in the table. As will be apparent from the table, by fermentation according to the invention, the amount of acid produced in 20 hours is increased.

*Table I*

| Ferment In Addition to Baker's Yeast | pH | | Percent Acid as Lactic | | |
|---|---|---|---|---|---|
| | Initial | 20 Hours | Initial | 20 Hours | Increase |
| None | 5.75 | 4.75 | 0.236 | 0.327 | 0.091 |
| P.c.-dextrose (0.125%) | 5.75 | 4.15 | 0.222 | 0.472 | 0.250 |
| P.c.-dextrose (0.125%) Y.E., 0.25% | 5.85 | 4.05 | 0.222 | 0.571 | 0.349 |
| P.c.-dextrose (0.125%) Y.E., 0.5% | 6.00 | 4.0 | 0.236 | 0.651 | 0.415 |
| P.c.-dextrose (0.125%) Y.E., 0.75% | 6.05 | 4.0 | 0.236 | 0.880 | 0.644 |
| P.c.-dextrose (0.125%) Y.E., 1.0% | 6.10 | 4.0 | 0.208 | 0.833 | 0.625 |
| Y.E. 1.0% | 6.10 | 5.45 | 0.250 | 0.496 | 0.246 |

EXAMPLE II

In the following table there are set forth results of fermentations wherein there were employed as fortifying agents for the P.c.-dextrose, yeast extract ingredients as indicated in the table. The higher levels of acid produced in treatment 2 and treatment 3 indicate that amino acids are the active ingredients supplied by yeast extract since the purine, pyrimidines and vitamins employed in treatment 4 provided no stimulation.

*Table II*

| Treatment | Ferment In Addition To Baker's Yeast |
|---|---|
| | 0.06% P.c.-dextrose Plus: |
| 1 | None. |
| 2 | Vitamin-free Casamino acids (a casein hydrolysate product of Difco Labs), 1%; DL-tryptophane, 0.01%; Adenine, 67 p.p.m.; and Pyrimidines (Cytosine, 49 p.p.m.; thymine, 98 p.p.m.; and uracil, 98 p.p.m.). |
| 3 | Vitamin-free Casamino acids (a product of Difco Labs), 1%; DL-tryptophane, 0.01%; and vitamins (folic acid, 0.08 p.p.m.; riboflavin, 0.08 p.p.m.; niacin, 2.0 p.p.m.; pantothentate, 1.2 p.p.m.; pyridoxine, 0.1 p.p.m.; and thiamine, 0.2 p.p.m.). |
| 4 | Adenine, 67 p.p.m.; pyrimidines as in (2); and vitamins as in (3). |

| Treatment | pH | | Percent Acid as Lactic | | |
|---|---|---|---|---|---|
| | Initial | 19 Hours | Initial | 19 Hours | Increase |
| 1 | 5.65 | 4.3 | 0.346 | 0.536 | 0.190 |
| 2 | 5.80 | 4.1 | 0.319 | 0.729 | 0.410 |
| 3 | 5.80 | 4.1 | 0.295 | 0.725 | 0.430 |
| 4 | 5.40 | 4.2 | 0.330 | 0.550 | 0.220 |

EXAMPLE III

| Treatment | Ferment In Addition to Baker's Yeast |
|---|---|
| | 0.07% P.c.-dextrose Plus: |
| 1 | None. |
| 2 | Casamino acids, vitamin free (0.1%). |
| 3 | Adenine (125 p.p.m.) plus guanine (125 p.p.m.). |
| 4 | Tryptophane (425 p.p.m.) plus cysteine (425 p.p.m.). |
| 5 | Casamino acids, vitamin free (0.1%); adenine (125 p.p.m.); guanine (125 p.p.m.). |
| 6 | Casamino acids (0.1%); tryptophane (425 p.p.m.); cysteine (425 p.p.m.). |

| Treatment | pH | | Percent Acid as Lactic | | |
|---|---|---|---|---|---|
| | Initial | 20 Hours | Initial | 20 Hours | Increase |
| 1 | 5.8 | 4.85 | 0.222 | 0.445 | 0.223 |
| 2 | 5.9 | 4.20 | 0.222 | 0.518 | 0.296 |
| 3 | 5.8 | 4.40 | 0.247 | 0.625 | 0.378 |
| 4 | 5.6 | 4.45 | 0.305 | 0.496 | 0.191 |
| 5 | 5.8 | 4.30 | 0.305 | 0.628 | 0.323 |
| 6 | 5.8 | 4.40 | 0.361 | 0.556 | 0.195 |

The stimulation provided by vitamin free Casamino acids was relatively small due to the low level employed. The combination of adenine and guanine provided a marked stimulation whether used in conjunction with Casamino acids or by themselves. Tryptophane and cysteine provided no stimulation as measured by the increase in acidity. Another basis for comparison is to use only the final acidity values, and assuming that the variations in initial acidity were due to experimental variation. Using this criterion, the table below shows the increase in final acidity over the control sample containing unfortified P.c.-dextrose.

*Table III–A*

| Treatment | Acidity (Increase over Control) |
|---|---|
| 1. Casamino acids | 0.073 |
| 2. Adenine-guanine | 0.180 |
| 3. Tryptophane-cysteine | 0.051 |
| 4. (1) and (2) | 0.183 |
| 5. (1) and (3) | 0.111 |

The data of Table III–A indicates that tryptophane and cysteine did have a slight stimulatory effect, and that this stimulation was additive to the stimulation by Casamino acids. The effects produced by Casamino acids and adenine plus guanine, however, were not additive.

EXAMPLE IV

In the following table there are set forth results of fermentations employing P.c.-dextrose and yeast products as indicated in the table. As is indicated in the table, yeast autolysate provided a greater stimulation than does an equal weight of yeast extract.

*Table IV*

| Treatment | Ferment In Addition to Baker's Yeast |
|---|---|
| 1 | None. |
| 2 | P.c.-dextrose (0.065%). |
| 3 | P.c.-dextrose (0.065%), Yeast extract (0.5%). |
| 4 | P.c.-dextrose (0.065%), Inactive yeast (0.5%). |
| 5 | P.c.-dextrose (0.065%), Solubilized yeast (0.5%). |
| 6 | P.c.-dextrose (0.065%), Yeast autolysate (0.5%). |

| Treatment | pH | | Percent Acid as Lactic | | |
|---|---|---|---|---|---|
| | Initial | 18 Hours | Initial | 18 Hours | Increase |
| 1 | 5.67 | 4.55 | 0.250 | 0.456 | 0.206 |
| 2 | 5.50 | 4.65 | 0.200 | 0.436 | 0.236 |
| 3 | 5.85 | 4.40 | 0.242 | 0.600 | 0.358 |
| 4 | 5.67 | 4.35 | 0.213 | 0.547 | 0.334 |
| 5 | 5.65 | 4.28 | 0.225 | 0.542 | 0.317 |
| 6 | 5.55 | 4.20 | 0.246 | 0.661 | 0.415 |

EXAMPLE V

In the following table there are set forth results of fermentations employing P.c.-dextrose, baker's yeast, active dry yeast, and vitamin free Casamino acids (a product of Difco Labs) as indicated in the tables. In this example, the amount of baker's yeast is as indicated in the table rather than the 2 parts per 1000 parts of flour for the usual test sponges described above.

*Table V*

TREATMENT FERMENT
1. Baker's Yeast, 0.14%
2. Baker's Yeast, 0.14%; and P.c.-dextrose, 0.066%
3. Active dry yeast, 0.14%
4. Active dry yeast, 0.14%; and P.c.-dextrose 0.066%
5. None
6. P.c.-dextrose, 0.066%
7. Baker's Yeast, 0.14%; and vitamin-free Casamino acids, 0.1%
8. Baker's Yeast, 0.14%; P.c.-dextrose, 0.067%; and vitamin-free Casamino acids, 0.1%

| Treatment | pH | | Percent Acid as Lactic | | |
|---|---|---|---|---|---|
| | Initial | 20 Hours | Initial | 20 Hours | Increase |
| 1 | 5.65 | 5.00 | 0.300 | 0.443 | 0.143 |
| 2 | 5.70 | 4.70 | 0.238 | 0.435 | 0.197 |
| 3 | 5.65 | 5.30 | 0.333 | 0.380 | 0.047 |
| 4 | 5.65 | 4.95 | 0.283 | 0.444 | 0.161 |
| 5 | 5.70 | 5.20 | 0.183 | 0.416 | 0.233 |
| 6 | 5.80 | 4.00 | 0.200 | 0.850 | 0.650 |
| 7 | 5.80 | 5.00 | 0.316 | 0.496 | 0.180 |
| 8 | 5.80 | 4.60 | 0.267 | 0.574 | 0.307 |

The large amount of acid produced in the P.c.-dextrose treatment No. 6 as compared with that produced in the P.c.-dextrose, yeast treatment No. 2, indicates that the yeast inhibits the production of acid by the P.c.-dextrose. The greater production of acid in the P.c.-dextrose and baker's yeast sponge after the addition of Casamino acids as shown in treatment No. 8 indicates that the yeast is inhibiting the Pediococcus cerevisiae by exhaustion of nutrients.

EXAMPLE VI

In the following table, there are set forth the results of fermentations wherein yeast autolysate is employed as a fortifying agent, baker's yeast is employed in varying amounts, and *Pediococcus cerevisiae* is used as a culture derived by incubation for 24 hours in a glucose-yeast autolysate medium. The percentages of weight percent of the flour.

Table VI

| Treatment | Ferment |
|---|---|
| 1 | None. |
| 2 | Baker's Yeast: 0.2%. |
| 3 | P.c.-dextrose: 0.2%. |
| 4 | Baker's Yeast: 0.2%, P.c.-dextrose: 0.2%. |
| 5 | P.c.-dextrose: 0.2%; Yeast Autolysate: 0.2%. |
| 6 | Baker's Yeast: 0.2%; P.c.-dextrose: 0.2%; Yeast Autolysate (0.2%). |
| 7 | Baker's Yeast: 0.04%; P.c.-dextrose: 0.2%. |
| 8 | P.c.-dextrose culture (no yeast). |

| Treatment | pH | | Percent Acid as Lactic | | |
|---|---|---|---|---|---|
| | Initial | 15 Hours | Initial | 15 Hours | Increase |
| 1 | 5.58 | 5.07 | 0.372 | 0.466 | 0.094 |
| 2 | 5.54 | 4.57 | 0.420 | 0.550 | 0.130 |
| 3 | 4.70 | 3.78 | 0.350 | 0.870 | 0.520 |
| 4 | 5.75 | 4.40 | 0.338 | 0.594 | 0.256 |
| 5 | 5.61 | 3.80 | 0.404 | 0.880 | 0.476 |
| 6 | 5.76 | 4.51 | 0.367 | 0.572 | 0.205 |
| 7 | 5.80 | 3.98 | 0.348 | 0.698 | 0.350 |
| 8 | 5.63 | 3.65 | 0.441 | 1.038 | 0.597 |

Reducing the level of yeast in the sponge (treatment No. 7) resulted in a large increase in the amount of acid produced. Further, the use of an active culture (treatment No. 8) resulted in an increased rate of acid production.

EXAMPLE VII

In the following tables there are set forth fermentations of sponges of the compositions indicated and employing the ferments indicated in the tables. It will be noted that the pH values and acidity at the end of 22 hours is about the same for the sponges. For the sponge in which *Pediococcus cerevisiae* was used, this pH and acidity would have been attained within a shorter fermentation, e.g. 15 hours, than would be required with the sponge containing only baker's yeast. The sponges reported here were not layered with vaspar.

Table VII

| Sponge | Flour, g. | Baker's Yeast, g. | P.c.-Dextrose, g. | H₂O, ml. | pH | | Percent Acid as Lactic | |
|---|---|---|---|---|---|---|---|---|
| | | | | | Initial | 22 Hours | Initial | 22 Hours |
| 1 | 1600 | 4 | | 700 | 5.80 | 4.29 | 0.30 | 0.61 |
| 2 | 1600 | 4 | 2 | 700 | 6.0 | 4.35 | 0.30 | 0.56 |

EXAMPLE VIII

In the following table there is set forth data which permit a comparison of laboratory fermentations and commercial fermentations. The composition of the sponges is not known since they were prepared by a commercial bakery according to the baker's formula. These sponges were not layered with vaspar. The proportion of yeast and P.c.-dextrose was the same for the laboratory (¼ lb.) and the commercial (900 lbs.) sponges.

Table VIII

| Sponge | Weight, pounds | Initial | 15 hr. | Initial | 15 hr. | Increase |
|---|---|---|---|---|---|---|
| Baker's Yeast | 900 | 6.20 | 4.94 | 0.17 | 0.39 | 0.22 |
| P.c.-dextrose | 900 | 6.20 | 4.40 | 0.16 | 0.51 | 0.35 |
| Baker's Yeast | ¼ | 5.54 | 4.57 | 0.42 | 0.55 | 0.13 |
| P.c.-dextrose | ¼ | 5.70 | 3.78 | 0.35 | 0.87 | 0.52 |

EXAMPLE IX

This example illustrates the effect of varying the level of *P.c.-dextrose*. The formula for the sponges was as follows:

|   | Grams |
|---|---|
| Flour | 140 |
| Water | 70 |
| Baker's yeast | 0.42 |

The results are set forth in the following table.

Table IX

| P.c.-dextrose, percent | pH | | Percent Acid as Lactic | | |
|---|---|---|---|---|---|
| | Initial | 18 Hours | Initial | 18 Hours | Increase |
| 0.0 | 6.08 | 4.67 | 0.190 | 0.334 | 0.144 |
| 0.06 | 6.08 | 4.55 | 0.194 | 0.364 | 0.170 |
| 0.30 | 5.97 | 4.08 | 0.187 | 0.420 | 0.233 |
| 0.60 | 5.97 | 4.07 | 0.202 | 0.410 | 0.208 |

The term, *Pediococcus cerevisiae* as used here is intended to include the organisms described in Bergey's Manual of Determinative Bacteriology (Sixth edition) beginning on page 249, and includes the microorganisms *Pediococcus damnosus*, *Pediococcus perniciosus*, *Pediococcus sarcinaeformis*, *Pediococcus tetragenus*, *Pediococcus acidi lactici*, *Streptococcus damnosus*, *Streptococcus damnosus* var. *viscosus* and *Streptococcus damnosus* var. *pentosaceus*; these organisms having been established by Pederson (Bacteriol. Rev. 13, 225–232), as all being the same species although given these other names by the earlier workers in this field.

What is claimed is:

1. In the production of fermented cracker sponge by maintaining cracker sponge at a temperature and for a time sufficient for fermentation thereof to occur, the improvement which comprises including in the cracker sponge *Pediococcus cerevisiae* and an assimilable carbohydrate.

2. The method of claim 1 wherein an active culture of *Pediococcus cerevisiae* is added to the sponge.

3. The method of claim 1 wherein the amount of *Pediococcus cerevisiae* in the cracker sponge is up to about 6 grams per 100 pounds of flour present in the sponge.

4. In the production of fermented cracker sponge by maintaining cracker sponge at a temperature and for a time sufficient for fermentation thereof to occur, the improvement which comprises including in the cracker sponge an assimilable carbohydrate, *Pediococcus cerevisiae* and an organic source of nitrogen.

5. The method of claim 4, wherein the organic source of nitrogen is yeast extract.

6. The method of claim 4 wherein the organic source of nitrogen is yeast extract and the proportion of yeast extract and *Pediococcus cerevisiae* is up to about 6 grams per 100 pounds of flour present in the sponge of *Pediococcus cerevisiae* and 0.05–3.0 wt. percent yeast extract on the sponge.

7. The method of claim 4 wherein the organic source of nitrogen is inactive yeast.

8. The method of claim 4 wherein the organic source of nitrogen is solubilized yeast.

9. The method of claim 4 wherein the organic source of nitrogen is yeast autolysate.

10. The method of claim 1, wherein there is included in the sponge baker's yeast.

11. The method of claim 10 wherein the amount of baker's yeast is about 0.02–0.06 wt. percent of the sponge.

12. The method of claim 4 wherein the organic source of nitrogen is protein hydrolysate amino acids.

13. The method of claim 4 wherein the organic source of nitrogen is an admixture of adenine and guanine.

14. The method of claim 4 wherein the organic source of nitrogen is an admixture of tryptophane and cysteine.

15. The method of claim 4 wherein the organic source of nitrogen is the combination of protein hydrolysate amino acids and adenine.

16. The method of claim 4 wherein the organic source of nitrogen is the combination of protein hydrolysate amino acids, tryptophane and guanine.

17. Cracker sponge comprising as a ferment *Pediococcus cerevisiae* and an assimilable carbohydrate.

18. Cracker sponge comprising as a ferment *Pediococcus cerevisiae* and an assimilable carbohydrate, and as a fortifying agent for said ferment an organic source of nitrogen.

References Cited in the file of this patent

UNITED STATES PATENTS 2,920,964    Oakes _____ Jan. 12, 1960

OTHER REFERENCES

Bergey's Manual, 7th ed., The Williams and Wilkins Co., Baltimore, Md., 1957, pp. 529 to 530.